Patented Apr. 4, 1944

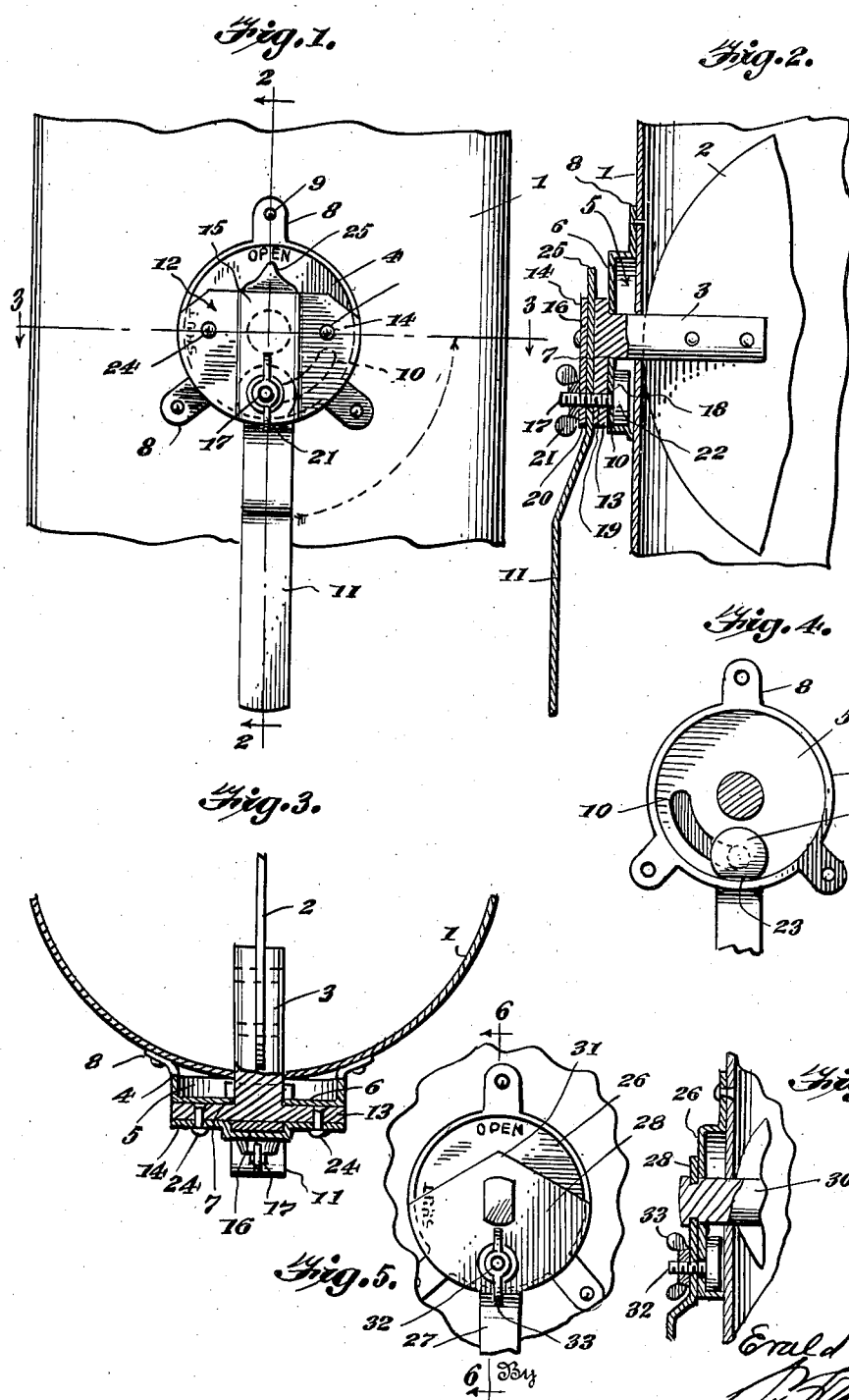

2,345,997

UNITED STATES PATENT OFFICE 2,345,997

DIAL DAMPER REGULATOR

Evald Anderson, North Quincy, Mass.

Application September 3, 1942, Serial No. 457,184

2 Claims. (Cl. 74—531)

The present invention is directed to improvements in damper regulators, and more particularly to one of the dial type.

The primary object of the invention is to provide a device of this character for use in connection with ventilating pipes of ships, the construction being such that accurate adjustment can be obtained in a simple and practical manner.

Another object of the invention is to provide a device of this nature so constructed that adjustment of the damper plate can be quickly made, and the plate held in any position of adjustment regardless of the movement of the ship, thus assuring proper ventilation under all conditions.

Another object of the invention is to provide a damper regulator of simple, rugged and economical construction adapted to be easily and quickly attached on ducts and pipes.

With these and other objects in view, this invention resides in the novel features of construction, formation, combination and arrangement of parts to be hereinafter more fully described and claimed, and illustrated in the accompanying drawing, in which:

Figure 1 is a side elevation showing the device in place upon a duct or pipe;

Figure 2 is a sectional view on line 2—2 of Figure 1;

Figure 3 is a sectional view on line 3—3 of Figure 1;

Figure 4 is a face view of the bearing plate;

Figure 5 is a side view of a modified form of the device;

Figure 6 is a sectional view on line 6—6 of Figure 5.

Referring to the drawing, 1 designates a duct or pipe for the passage of air for ventilating purpose, or gases when the device is used in connection with heating apparatus. The passage of air or gases is regulated or controlled by a conventional damper plate 2 having fixed thereto in the customary manner a shaft 3 which projects through the duct 1. It will be of course understood that a similar shaft is fixed to the damper plate 2 diametrically opposite the shaft 3, both being rotatable in the duct 1.

The device further comprises a circular plate 4 formed from suitable sheet metal and pressed to form on its inner face a recess 5 and resultant table 6 having a central bearing 7 through which the shaft 3 extends for rotatable movement therein.

The plate 4 is provided with ears 8 for the passage of rivets 9 employed to firmly secure the plate to the pipe or duct.

The table 6 of the plate 4 has formed therein an arcuate slot 10, the purpose of which will later appear.

This table has stamped thereon the words "Open" and "Shut" in order that the operator may observe at a glance whether the damper plate 2 is fully open or closed.

A damper plate control handle 11 is provided, and in order to operatively connect the same to the plate 2 a fixture 12 is employed, and includes relatively large inner and outer plates 13 and 14, respectively. The outer plate is relatively thin compared to the inner plate, and has pressed therein a rib 15 to provide an open ended socket 16 closed by the plate 14 which intimately engages the plate 13, thus serving as a closure for one side of the socket.

The handle 11 is formed from suitable gage metal and has its inner end fitted in the socket 16 so that upon swinging the handle the fixture 12 will be rotated in order to actuate the shaft 3 of the damper plate 2 to move the same into selected adjusted positions. The outer or extended end of the shaft 3 is fixed to the plate 14 in any approved manner.

In order to hold the fixture 12 in adjusted positions a clamping bolt 17 is provided, the shank thereof being engaged in the slot 10 of the table 6 and passes through the coinciding openings 18, 19 and 20, respectively, formed in the plate 14, handle 11 and rib 15.

The extended end of the bolt 17 has threaded thereon a wing nut 21 adapted to clampingly engage the rib 15 to hold the handle in the socket 16 and the fixture 12 in binding engagement with the table 6 of the plate 4. It will be observed that the bolt 17 not only serves to hold the fixture in frictional engagement with the table 6, but also retains the handle in fixed relation thereto.

To prevent rotation of the bolt 17 when the wing nut 21 is manipulated the head 22 thereof is formed with a flat face 23 adapted to lie adjacent the wall of the recess 5 and to contact therewith to positively prevent rotation of the bolt.

The plates 13 and 14 are held in intimate engagement by rivets 24, or in any other approved manner.

The inner end of the handle 11 extends from one end of the socket 16 and constitutes a pointer 25 movable over the table 6 and between the designations "Open" and "Shut." Obviously the movement of the handle and pointer are limited by the bolt 17 when contacting with the end walls of the slot 10.

Owing to the fact that the plate 13 of the fixture 12 is relatively large considerable area is provided for frictional engagement between said plate and table 6 upon manipulation of the wing nut 21.

Briefly the operation is as follows:

Upon releasing the wing nut 21 the handle 11 may be freely swung to full open or closed position, and positively held in a selected position upon clamping the wing nut on the rib 15 of the fixture and drawing the head 22 of the bolt into binding engagement with the under surface of the table. Obviously the damper plate 2 can be held in various partial open positions when desired, such positions of adjustment being discernable by the location of the pointer 25 between the "Open" and "Shut" position designations.

If desired the threads of the bolt 17 may be up-set to prevent accidental disengagement of the wing nut therefrom.

In the modified form of the invention, as shown in Figures 5 and 6, the plate 26 is formed in the same manner as the plate 4 of the preferred form. A handle 27 is provided and has integral therewith a relatively large head 28 and to which the damper disk shaft 30 is fixed, said head having a pointer 31 thereon. The handle 27 and its head 28 are held in adjusted positions through the medium of the clamping bolt 32 and wing nut 33, as in the preferred form of the invention.

What is claimed is:

1. A device of the class described comprising a bearing plate adapted to be mounted on a housing having a shaft extending there through and having an arcuate slot formed therein, a handle, a connection between the handle and shaft comprising inner and outer plates, the outer plate having an open ended socket formed therein for receiving an end of the handle, a bolt having its shank movable in said slot and passing through both plates and the handle, and a wing nut engaged on the bolt and engageable with the outer plate to hold said plates and handle in adjusted relationship upon the bearing plate.

2. A device of the class described comprising a bearing plate adapted to be mounted on a housing having a shaft extending there through and having an arcuate slot formed therein, said bearing plate having a recess therein, inner and outer plates, the outer plate having a socket formed therein, a handle engaged in the socket, a bolt having its head movable in the recess, the shank of the bolt passing through the slot, inner and outer plates and handle, a wing nut engaged on the extended end of the bolt and engageable with the outer plate to hold the plates and handle in adjusted positions on the bearing plate, the head of the bolt having a flat face for engagement with the side wall of the recess to prevent rotation of the bolt during manipulation of the wing nut.

EVALD ANDERSON.